(12) United States Patent
Wang et al.

(10) Patent No.: US 7,288,283 B2
(45) Date of Patent: Oct. 30, 2007

(54) UV-ABSORBING COATINGS AND METHODS OF MAKING THE SAME

(75) Inventors: Yei-ping Wang, Troy, MI (US);
Richard M. Laine, Ann Arbor, MI (US)

(73) Assignee: Guardian Industries, Corp., Auburn Hills, MI (US)

( * ) Notice: Subject to any disclaimer, the term of this patent is extended or adjusted under 35 U.S.C. 154(b) by 414 days.

(21) Appl. No.: 10/922,235

(22) Filed: Aug. 20, 2004

(65) Prior Publication Data

US 2006/0040108 A1  Feb. 23, 2006

(51) Int. Cl.
*B32B 27/38* (2006.01)
*B05D 3/02* (2006.01)
*G02B 5/22* (2006.01)
*F21V 9/06* (2006.01)

(52) U.S. Cl. .............. 427/162; 427/386; 427/387; 428/413; 428/447; 252/588

(58) Field of Classification Search ............... 428/413, 428/447; 427/162; 252/588
See application file for complete search history.

(56) References Cited

U.S. PATENT DOCUMENTS

| | | | |
|---|---|---|---|
| 4,051,161 A | 9/1977 | Proskow | |
| 4,111,771 A * | 9/1978 | Darms et al. | 528/310 |
| 4,373,061 A | 2/1983 | Ching | |
| 4,421,904 A * | 12/1983 | Eckberg et al. | 528/27 |
| 4,478,876 A * | 10/1984 | Chung | 427/515 |
| 4,555,559 A | 11/1985 | Kimura et al. | |
| 5,085,903 A * | 2/1992 | Kapp et al. | 428/34.6 |
| 5,260,455 A * | 11/1993 | Eckberg | 549/215 |
| 5,820,978 A * | 10/1998 | Huang | 428/331 |
| 5,925,469 A * | 7/1999 | Gee | 428/447 |

(Continued)

OTHER PUBLICATIONS

Park et al, "Preparation and Optical Properties of Silica-Poly(ethylene oxide) Hybrid Materials", Journal of Sol-Gel Science and Technology 16, 1999, pp. 235-241.

(Continued)

*Primary Examiner*—Randy Gulakowski
*Assistant Examiner*—John J. Figueroa
(74) *Attorney, Agent, or Firm*—Nixon & Vanderhye P.C.

(57) ABSTRACT

Methods of forming UV-absorbent transparent coatings and transparent substrates coated with the same allow for a relatively lower temperature cross-linkage reaction between a UV-absorbent compound and an epoxy-alkoxysilane. More specifically, UV-absorbent coatings on transparent substrates are formed by prepolymerizing a mixture consisting essentially of a benzophenone, an epoxy alkoxysilane and an organic catalyst at a temperature of between about 40° C. to about 130° C. and for a time sufficient such that between about 30% to about 70% of the epoxy alkoxysilane has been converted to a ring-opened oligomer or polymer. Such prepolymerized mixture may then be hydrolyzed and coated onto the surface of a transparent substrate, and thereafter cured at a temperature of less than about 200° C. for a time sufficient to cross-link the hydrolyzed alkoxysilane with itself and the glass surface. Most preferably, the prepolymerized mixture is hydrolyzed prior to being coated onto the substrate in an acidic alcoholic solution. Preferred for use in the present invention as a UV-absorbent compound is tetrahydroxybenzophenone. The preferred epoxy alkoxysilane is 3-glycidoxypropyl trimethoxysilane. It is especially preferred that prepolymerization be effected in the presence of an organic catalyst, such as triethylamine (TEA).

7 Claims, 2 Drawing Sheets

U.S. PATENT DOCUMENTS

Figure 1:
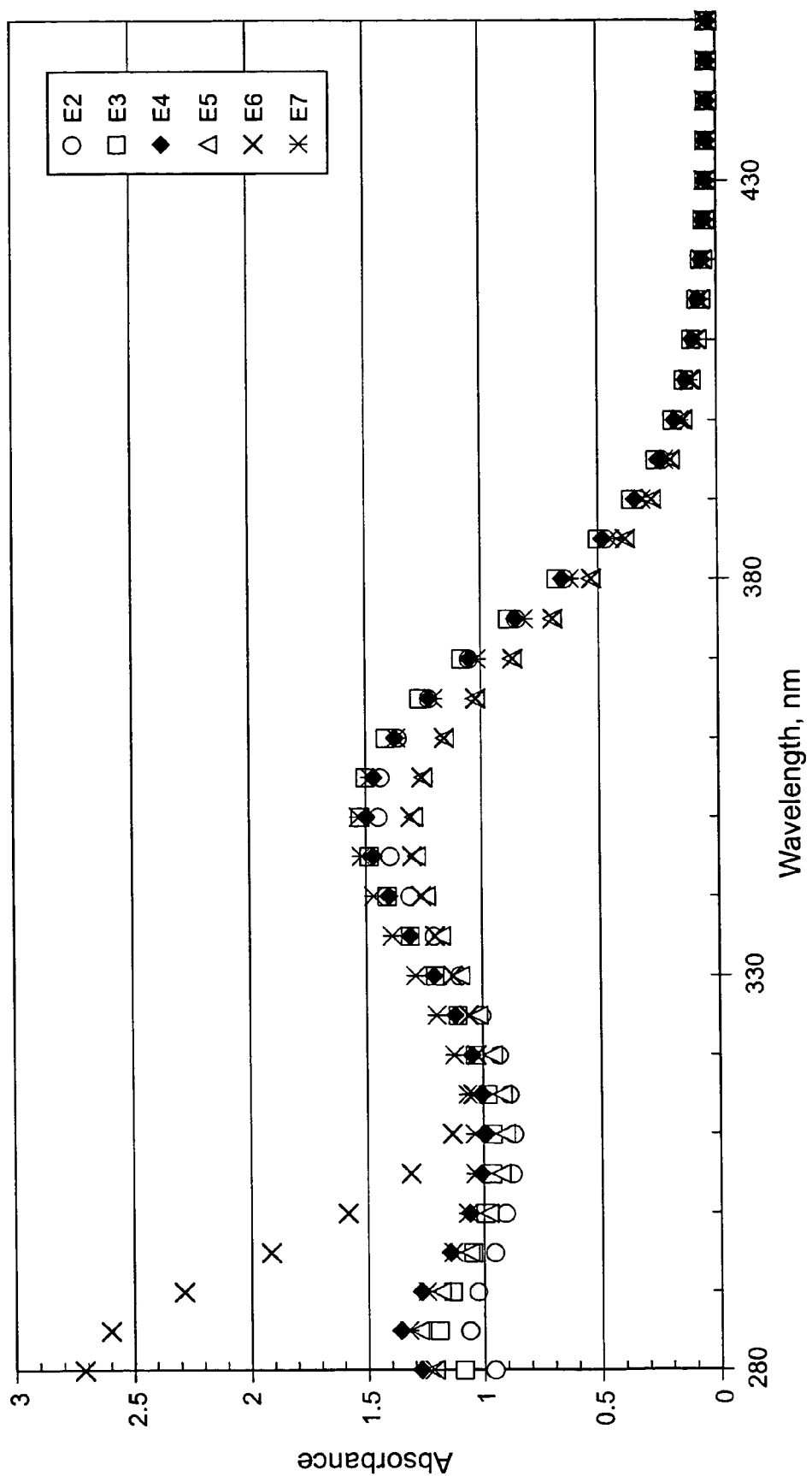

| | | |
|---|---|---|
| 6,106,605 A | 8/2000 | Basil et al. |
| 6,288,150 B1 | 9/2001 | Bier |
| 6,497,964 B1 * | 12/2002 | Matsumura et al. ........ 428/447 |
| 7,129,021 B2 * | 10/2006 | Noglik et al. ............ 430/273.1 |

OTHER PUBLICATIONS

Park et al, "Proton-Conducting Properties of Inorganic-Organic Nanocomposites", Journal of the Electrochemical Society, 148(6), 2001, pp. A616-A-623.

Finnefrock et al, "Metal Oxide Containing Mesoporous Silica with Bicontinuous 'Plumber's Nightmare' Morphology from a Block Copolymer—Hybrid Mesophase", Communications, Angew. Chem. Int. Ed. 40, No. 7, 2001, pp. 1207-1211.

Finnefrock et al, "The Plumber's Nightmare: A New Morphology in Block Copolymer—Ceramic Nanocomposites and Mesophorous Aluminosilicates", J. Am. Chem. Society, 125, 2003, pp. 13084-13093.

International Search Report.

* cited by examiner

UV-ABSORBING COATINGS AND METHODS OF MAKING THE SAME

FIELD OF THE INVENTION

The present invention relates generally to the field of UV-absorbing protective coatings for substrates, e.g., glass.

BACKGROUND AND SUMMARY OF THE INVENTION

There is a continuing need to block the ultraviolet (UV) transmission (wavelength <380 nm) from solar radiation through window glass. In this regard, U.S. Pat. No. 6,106,605 to Basil et al (the entire content of which is expressly incorporated hereinto by reference) discloses a silica-free, abrasion resistant coating comprised of an organic UV absorbing compound, such as hydroxybenzophenone in an inorganic oxide matrix formed by the hydrolysis and condensation of an organo-alkoxysilane. Improvements to UV coatings and their methods of manufacture are still sought.

U.S. Pat. No. 4,051,161 to Proskow (the entire content of which is incorporated hereinto by reference) discloses several alkoxysilane-benzophenone monomers prepared by reacting an alkoxysilane that contains an epoxide moiety with a hydroxyl group on a hydroxybenzophenone to form an α, β hydroxy-ether which covalently links the hydroxybenzophenone and the silane. Thus, according to Proskow '161, monomeric species may be incorporated into polymers containing polysilicic acid (e.g. silica) and hydroxylated fluorocopolymer systems.

UV-absorbing coatings have also been made and sold more than one year prior to the date of the present application in which an n-propanol (alcoholic) solution of tetrahydroxybenzophenone, 3-glycidoxypropyl trimethoxy silane, and acetic acid was applied onto glass as a coating after first partially hydrolyzing the 3-glycidoxypropyl trimethoxysilane component. The coated glass substrate was then heated to between about 200° C. to about 220° C. so as to cross-link the 3-glycidoxypropyl trimethoxysilane component via ring-opening polymerization and cross-linkage thereof. The cross-linked 3-glycidoxypropyl trimethoxysilane moieties therefore serve as a matrix in which the tetrahydroxybenzophenone compound is physically bound.

While the prior technique described immediately above does in fact produce satisfactory UV-absorbing coatings, further improvements are still desirable. For example, it would be highly desirable if the UV-absorbing compound (e.g., tetrahydroxybenzophenone) were bound chemically to the cross-linked 3-glycidoxypropyl trimethoxysilane moieties so as to provide more durable, leach resistant coatings with UV-absorption capabilities. In addition, it would be desirable to effect cross-linkage of the 3-glycidoxypropyl trimethoxysilane moieties at temperatures less than about 200° C. so that production line speeds could be increased thereby improving productivity. Likewise, reduction in production line temperatures will reduce wear and tear of the production line components resulting in longer component life. Finally, prepolymerization and temperature reductions will reduce the amounts of 3-glycidoxypropyl trimethoxysilane lost as volatiles during the coating process making this a less polluting and less costly process. It is towards fulfilling these desirable objects that the present invention is directed.

Broadly, the present invention is embodied in methods of forming UV-absorbent transparent coatings and transparent substrates coated with the same which allow for relatively lower temperature cross-linkage reactions between a UV-absorbent compound and an epoxy alkoxysilane. More specifically, in especially preferred forms of the invention, UV-absorbent coatings on transparent substrates are formed by prepolymerizing a mixture consisting essentially of a hydroxy-benzophenone, an epoxyalkoxysilane and an organic catalyst at an elevated temperature of between about 40° C. to about 130° C. and for a time sufficient such that between about 30 to about 70% of the epoxyalkoxysilane moieties form ring-opened oligomers and polymers with degrees of polymerization of between about 2 to about 2000, and more preferably between about 2 to 200. Such prepolymerized mixture may then be coated onto the surface of a transparent substrate.

Most preferably, the prepolymerized mixture is hydrolyzed prior to being coated onto the substrate in an alcoholic acidic solution.

Preferred for use in the present invention as a UV-absorbent compound is tetrahydroxybenzophenone. The preferred epoxyalkoxysilane is 3-glycidoxypropyl trimethoxysilane (sometimes hereinafter referenced more simply as "glymo"). It is especially preferred that prepolymerization be effected in the presence of a tertiary amine such as triethylamine (TEA) as the organic catalyst which is only one of many possible amine catalysts that one practiced in the art will recognize. In addition, it is also possible to use a basic alkoxide, ROM where M is an alkali metal or alkaline earth metal and RO is any suitable, soluble organic that will react with the glymo epoxy ring or with the $RSi(OR)_3$ group. Likewise, it is possible to use species such as $R_4NOH$ and $R_4POH$ as catalysts for the ring-opening oligomerization or polymerization of the epoxy group on glymo.

These and other aspects and advantages will become more apparent after careful consideration is given to the following detailed description of the preferred exemplary embodiments thereof.

BRIEF DESCRIPTION OF THE ACCOMPANYING DRAWINGS

Figure 2:
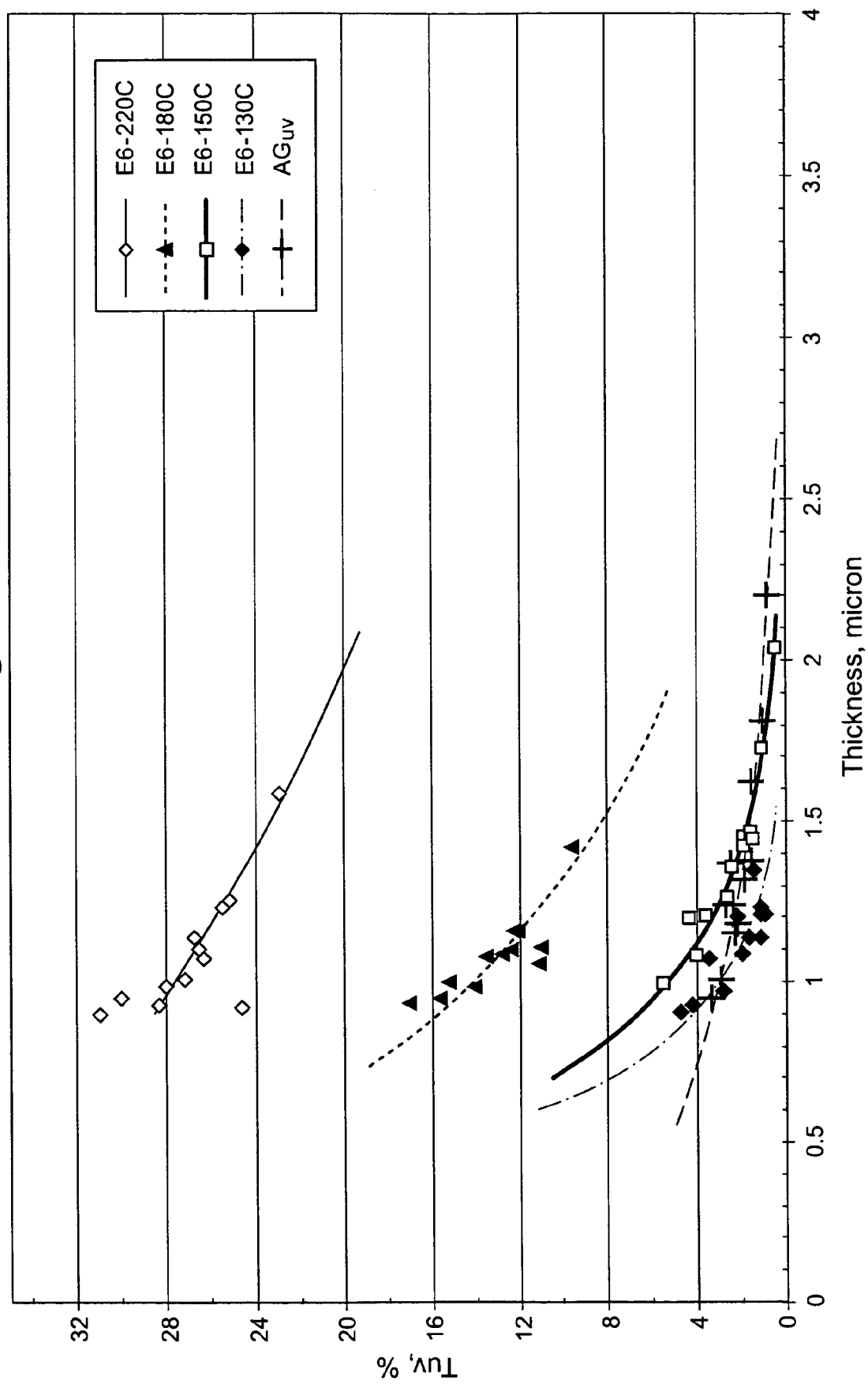

Reference will hereinafter be made to the accompanying drawings, wherein like reference numerals throughout the various FIGURES denote like structural elements, and wherein;

FIG. 1 is a plot of absorbance versus wavelength for UV absorbing polymers tested in accordance with Example 2 below; and FIG. 2 is a plot of the percent UV transmission ($T_{UV}$) versus thickness of the coatings.

DETAILED DESCRIPTION OF THE INVENTION

The coatings of the present invention will necessarily comprise the reaction product of a UV absorbent compound and an alkoxysilane, which contains an epoxide moiety.

Any suitable UV absorbent organic compound may be employed in the practice of the present invention. Most preferably, the UV absorbent compound is a benzophenone. Suitable benzophenones include, for example, tetrahydroxybenzophenones, trihydroxybenzophenones, dihydroxybenzophenones, or hydroxybenzophenones. Most preferred is tetrahydroxybenzophenone (hereinafter "D50").

Suitable alkoxysilanes that contain an epoxide moiety (hereinafter termed "epoxyalkoxysilanes") include cyclohexylepoxy, cyclohexylepoxyethyl, cyclopentylepoxy, epoxyhexyl trimethoxy silanes, epoxyhexyl triethoxysilanes, glycidylmetheyldimethoxysilane and 3-glycidoxypropyl trimethoxysilane. Most preferably, the epoxyalkoxysilane is 3-glycidoxypropyl trimethoxysilane.

The molar ratio of the epoxyalkoxysilane to the benzophenone may be between about 1:1 to about 6:1, and preferably between about 2.5:1 to about 4.5:1.

In accordance with the present invention, the epoxyalkoxysilane and benzophenone are mixed together in the presence of a catalytically effective amount of between about 0.01 mol. % to about 10.0 mol. % (preferably between about 0.10 mol. % to about 0.50 mol. %) of the ring opening polymerization (ROP) catalyst. Preferred ROP catalysts include tertiary amines such as triethylamine (TEA) or tributylamine (TBA), which are representative of many possible amine catalysts that one practiced in the art will recognize. In addition, it is also possible to use a basic alkoxide ROM where M is an alkali metal or alkaline earth metal and RO is any suitable, soluble organic anion that will react with the glymo epoxy ring. Likewise, it is possible to use species such as R'$_4$NOH and R'$_4$POH as catalysts for the ring-opening oligomerization or polymerization of the epoxy group on glymo, wherein R'is hydrogen or an organic radical without any cross-linking sites, such as aliphatic radicals (e.g., methyl, ethyl, propyl, butyl and the like). TEA is most preferred as the catalyst when D50 is employed as the benzophenone and glymo is employed as the epoxyalkoxysilane.

The mixture of epoxyalkoxysilane, benzophenone and catalyst is then subjected to a prepolymerization step so as to chemically bond the epoxyalkoxysilane and benzophenone. Specifically, prepolymerization is achieved by heating the mixture to a temperature of between about 40° C. to about 130° C. (more preferably between about 70° C. to about 100° C.) for a time sufficient to initiate ring opening polymerization (ROP) of the epoxyalkoxysilane. Preferably, the mixture is maintained at the elevated temperature for a time sufficient to achieve between about 30 to about 70% conversion of the epoxyalkoxysilane to form a ring-opened oligomeric or polymeric product as suggested by the two types of reactions shown in the representative non-limiting reaction formulas below.

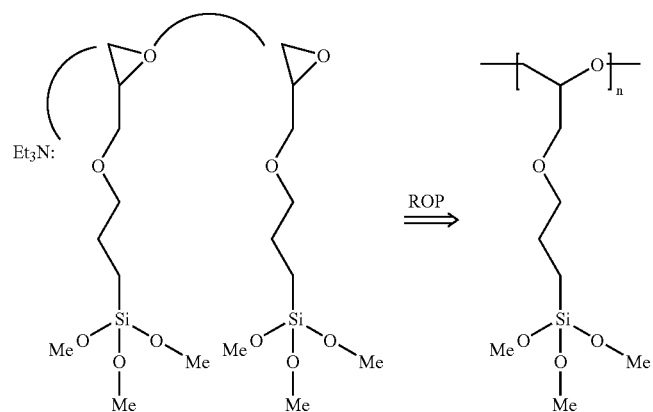

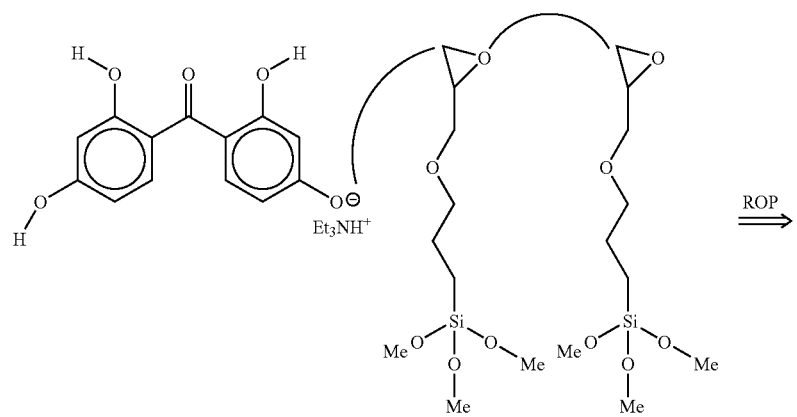

-continued

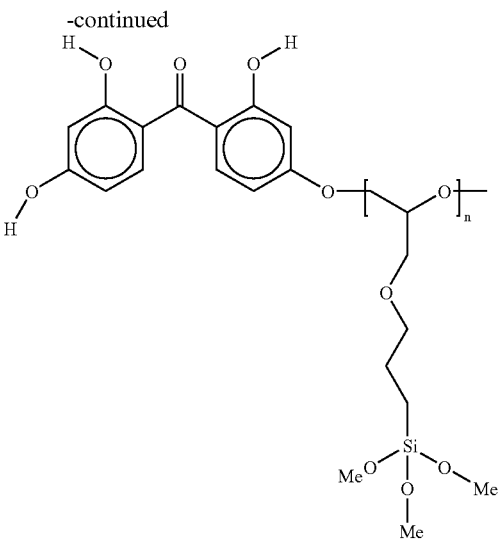

Preferably, the mixture is maintained at such elevated temperature for between 1 to 10 hours, and usually between 2 to 6 hours. When the mixture consists essentially of D50, glymo and TEA, the prepolymerization step is most preferably accomplished at a temperature of between about 80° C. to 90° C. for about 2 to 6 hours. The ring opening polymerization of epoxyalkoxysilane with the above-mentioned catalyst, with or without the presence of benzophenone, can also occur generating a polyethylene oxide-like hydrophilic coating.

The epoxy-alkoxysilane is then hydrolyzed by forming an alcoholic solution, for example ethanol, n-propanol, n-butanol, isopropanol, isobutanol or mixtures thereof, of the prepolymerized mixture in the presence of an acid (e.g., acetic acid) at hydrolyzing temperatures of between about 0° C. to about 60° C. for a time between about 4 to about 48 hours sufficient to effect at least about 20 to about 90% hydrolysis of the epoxy alkoxysilane.

A pre-dispersed silica solution may be added to the hydrolyzed mixture prior to the application onto a substrate. Alternatively or additionally, the pre-dispersed silica solution may be added to the mixture prior to hydrolysis, for example, before or after the prepolymerization step.

The hydrolyzed mixture may then be coated onto the surface of a transparent substrate (e.g., glass) and subjected to final curing conditions. In this regard, the coating of the hydrolyzed mixture may be accomplished via any conventional coating technique, including curtain coat, meniscus coat, spin coat, roll coat, spraying, padding or the like. The final curing conditions on the substrate surface are such as to cause cross-linkage of the partially or fully hydrolyzed alkoxysilane functionality and most preferably will be at a temperature of less than 200° C., for example, between about 130° C. to about 200° C., or between about 150° C. to about 200° C. A lower cure temperature is typically preferred as it allows for faster throughput of relatively thicker coatings. In this regard, the thickness of the coatings of the present invention will usually be between about 0.5 µm to about 5.0 µm.

The coatings of the present invention are sufficient to obtain peak UV absorption of between about 330 nm to about 380 nm.

The present invention will be further understood from the following non-limiting Examples

EXAMPLE 1

To a 150 ml round-bottom flask equipped with a condenser and under $N_2$ was added tetrahydroxybenzophenone (D50) in an amount of 9 g (36 mmol) and 3-glycidoxypropyltrimethoxysilane (glymo) in an amount of 17.1 g (72 mmol) to provide a 1:2 molar ratio of D50 to Glymo. The mixture was heated to 80° C. with stirring. The D50 did not dissolve in glymo at this temperature. Triethylamine (TEA) (0.1 moles vs. D50) was added via syringe. The D50 slowly dissolved (reacted) with glymo and the solution became clear. The viscosity of the clear solution increased with time. After 3 hours, the solution was allowed to cool to room temperature. The resulting viscous solution was thereafter dissolved in 30 ml n-propanol.

EXAMPLE 2

Example 1 was repeated to obtain several additional samples using the molar ratios of D50 and glymo and reaction times. The samples made in accordance with Example 1 and in accordance with this Example 2 are identified in Table 1 below as sample numbers E1-E7, respectively.

TABLE 1

| No. | Molar Ratio D50 to Glymo | Catalyst ($Et_3N$) (moles vs. D50) | Reaction temp. (° C.) | Reaction time (hr) |
|---|---|---|---|---|
| E1 | 1:2 | 0.1 moles vs. D50 | 80 | 3 |
| E2 | 1:1 | " | " | 1.5 |
| E3 | 1:2 | " | " | 2 |
| E4 | 1:3 | " | " | 3 |
| E5 | 1:4 | " | " | 5 |
| E6 | 1:5 | " | " | 5 |
| E7 | 1:6 | " | " | 5 |

Samples E2-E7 obtained from this Example 2 were tested for UV absorption characteristics. The UV absorption data appear in FIG. 1.

EXAMPLE 3

To a 250 ml round-bottom flask equipped with a condenser and under $N_2$ were added D50, glymo and a solvent n-propanol (n-PrOH) in the amounts noted below in Table 2 to produce samples E1-S through E8-S. The reaction mixture was heated to 90° C. with stirring. The D50 slowly dissolved in the glymo and the solution became clear. Triethylamine (TEA) (0.1 moles vs. D50) was added via syringe after complete dissolution. The viscosity of the clear solution increased with time. After a selected reaction time, the reaction product was allowed to cool to room temperature. A total of 40 ml of n-PrOH was added to the resulting reaction product, and the solution was transferred from reaction flask to a polypropylene bottle. Additional n-PrOH was added and the transfer process repeated until a total of 150 ml was used.

TABLE 2

| Sample | Molar Ratio D50 to Glymo | Solvent (n-PrOH) | Catalyst (Et₃N) (moles vs. D50) | Reaction temp. (° C.) | Reaction time (hr) | Yield (%) 7.31 ppm | 6.42 ppm | Mean |
|---|---|---|---|---|---|---|---|---|
| E1-S | 1:1 | 5 ml | 0.1 | 90 | 6 | — | 46 | 46 |
| E2-S | 1:1.5 | 5.0 | " | " | 6 | — | 54 | 54 |
| E3-S | 1:2 | 5.0 | " | " | 10 | — | 75 | 75 |
| E4-S | 1:2 | 5.0 | " | " | 10 | — | — | — |
| E5-S | 1:3 | 5.0 | " | " | 10 | 68.5 | 89 | 79 |
| E6-S | 1:4 | 10.0 | " | " | 12 | — | — | — |
| E7-S | 1:5 | 10.0 | " | " | 12 | — | — | — |
| E8-S | 1:6 | 10.0 | " | " | 12 | — | — | — |

*NMR yield = integration ratio at 7.31 ppm (new peak)/total integration ratio (7.25 + 7.31 ppm) times 100.
yield = integration ratio at 6.42 ppm (new peak)/total integration ratio (6.42 + 6.25 ppm) times 100.

EXAMPLE 4

Samples similar to E6 in Table 1 above were prepared and coated onto glass substrates and cured at temperatures of 130° C., 150° C., 180° C. and 220° C. The coatings were then tested in accordance with the following tests.

Yellowness (b*) Test: The b* value was measured on a Perkin Elmer Lamda 45 Spectrometer after being exposed to a 60° C. humid atmosphere within a humidity chamber for 72 hours.

Pencil Hardness Test: A pencil hardness gauge by Micro-Metrics Company having a set of calibrated drawing leads from HB to 8H was used. Starting at the softest lead HB (number 1), each lead was moved across the sample surface at about a 45° angle. The number of the lead, which scratched the film on the sample surface, was recorded as the pencil hardness number.

Tape Pull Test: Commercial Scotch-brand tape was adhered to the surfaces of the samples and then removed and the surface visually inspected for defects in the film. No film removal from the sample surface constituted passing of the test.

Windex® Cleaner Test: Samples were submerged in Windex® Cleaner and allowed to soak for 2 hours. The samples were dried and wiped with a cloth. Any film removal after wiping constituted failure of the test. The samples were also measured on a Perkin Elmer Lamda 45 Spectrometer before and after being soaked in Windex® Cleaner to determine the discoloration ΔE.

The results of such testing appear in Table 3 below.

TABLE 3

| Sample | b* | Pencil Hardness | Tape Pull | Windex ® Cleaner Wipe Test | ΔE - Windex ® Cleaner Soak |
|---|---|---|---|---|---|
| E6-130 | 2.1 | 3 | Pass | Pass | 1.2 |
| E6-150 | 2.2 | 3 | " | " | 1.1 |
| E6-180 | 1.0 | 6 | " | " | 0.5 |
| E6-220 | 0.3 | 6 | " | " | 0.1 |

Note:
All samples were covered with gel-like spots

The data in Table 3 showed that all samples cured to a final temperature of 180° C. or 220° C. passed all tests including pencil hardness and had good b* values. All samples passed the Windex® cleaner wipe and soak tests with the 130° C. and 150° C. samples having b* values that were relatively high.

The coatings in Table 3 were also examined for percent UV-transmission ($T_{uv}$, %) versus coating thickness. The data is plotted in FIG. 2 in comparison with one another and with the conventional ART-GUARD™ UV coating from Guardian Industries, Inc. ("AGuv") which has a final cure of 220° C. As can be seen, the lower temperature coatings all have acceptable UV-transmission characteristics (i.e., $T_{uv}$ is less than about 2%) depending on the thickness of the coating. Sample E6-220° C. did not pass however.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed:

1. A method of forming an ultraviolet (UV) absorbent coating on a transparent substrate comprising the sequential steps of:

(a) prepolymerizing a mixture consisting of a benzophenone, an epoxy alkoxysilane and a tertiary amine catalyst at an elevated temperature of between about 40° C. to about 130° C. for a time sufficient such that between about 30% to about 70% of the epoxy alkoxysilane moieties are in a ring-opened state;
(b) forming a solution of the prepolymerized mixture in an aqueous acidic alcoholic solution and allowing the prepolymerized mixture to hydrolyze so as to form a hydrolyzed coating material therefrom;
(c) coating a layer of the hydrolyzed coating material onto the surface of a transparent substrate; and thereafter
(d) curing the hydrolyzed coating material of the coating layer at an elevated temperature of less than about 200° C. and for a time sufficient to cross-link the epoxy alkoxysilane.

2. The method of claim 1, wherein the benzophenone is at least one selected from the group consisting of trihydroxybenzophenones, dihydroxybenzophenones, hydroxybenzophenones, and tetrahydroxybenzophenone.

3. The method of claim 1, wherein the epoxy alkoxysilane is at least one selected from the group consisting cyclohexylepoxy, cyclohexylepoxyethyl, cyclopentylepoxy, epoxyhexyl trimethoxy silanes, epoxyhexyl triethoxysilanes, glycidylmetheyldimethoxysilane and 3-glycidoxypropyl trimethoxysilane.

4. The method of claim 1, wherein the benzophenone is tetrahydroxybenzophenone, and the epoxy alkoxysilane is 3-glycidoxypropyl-trimethoxysilane, and wherein step (a) is practiced by prepolymerizing the mixture thereof in the presence of triethylamine (TEA).

5. The method of claim 1, wherein step (a) is practiced by maintaining the mixture at the elevated temperature by heating for between 2 to 10 hours.

6. The method of claim 1, wherein the aqueous acidic alcoholic solution comprises n-propanol.

7. The method of claim 1, wherein the tertiary amine catalyst is triethylamine (TEA) or tributylamine (TBA).

* * * * *